United States Patent [19]
Jardin

[11] 3,857,603
[45] Dec. 31, 1974

[54] CLAMPING LINKAGE FOR AUTOMOBILE SLIDING ROOFS

[75] Inventor: Hans Jardin, Krailling, Germany

[73] Assignee: Webasto-Werk W. Baier KG, Stockdorf/Munchen, Germany

[22] Filed: Apr. 9, 1973

[21] Appl. No.: 349,184

[30] Foreign Application Priority Data
Apr. 10, 1972 Austria .............................. 3066/72

[52] U.S. Cl. ........................... 296/137 F, 74/480 R
[51] Int. Cl. .............................................. B60j 7/00
[58] Field of Search ......... 296/137 H, 137 E, 137 F, 296/137 G, 137 R; 74/480 R, 520, 585

[56] References Cited
FOREIGN PATENTS OR APPLICATIONS
1,231,579  12/1966  Germany ....................... 296/137 G
65,895     6/1950   Netherlands ................... 296/137 F
1,167,194  4/1964   Germany ....................... 296/137 H
331,253    6/1930   Great Britain.................. 296/137 F Primary Examiner—Allen N. Knowles
Attorney, Agent, or Firm—Joseph A. Geiger

[57] ABSTRACT

A clamping linkage for the actuation of the clamping devices of rigid automobile sliding roofs, where the longitudinal clamping rods alongside the sliding roof panel are engaged by rocking levers which overlap at their inner ends and have slots engaged by the actuating pin of the rotatable actuating lever of a handle. The linkage is self-locking in its clamped position.

6 Claims, 3 Drawing Figures

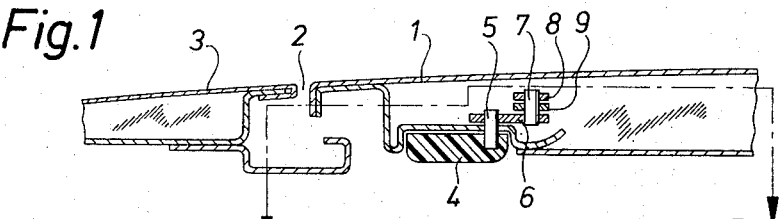
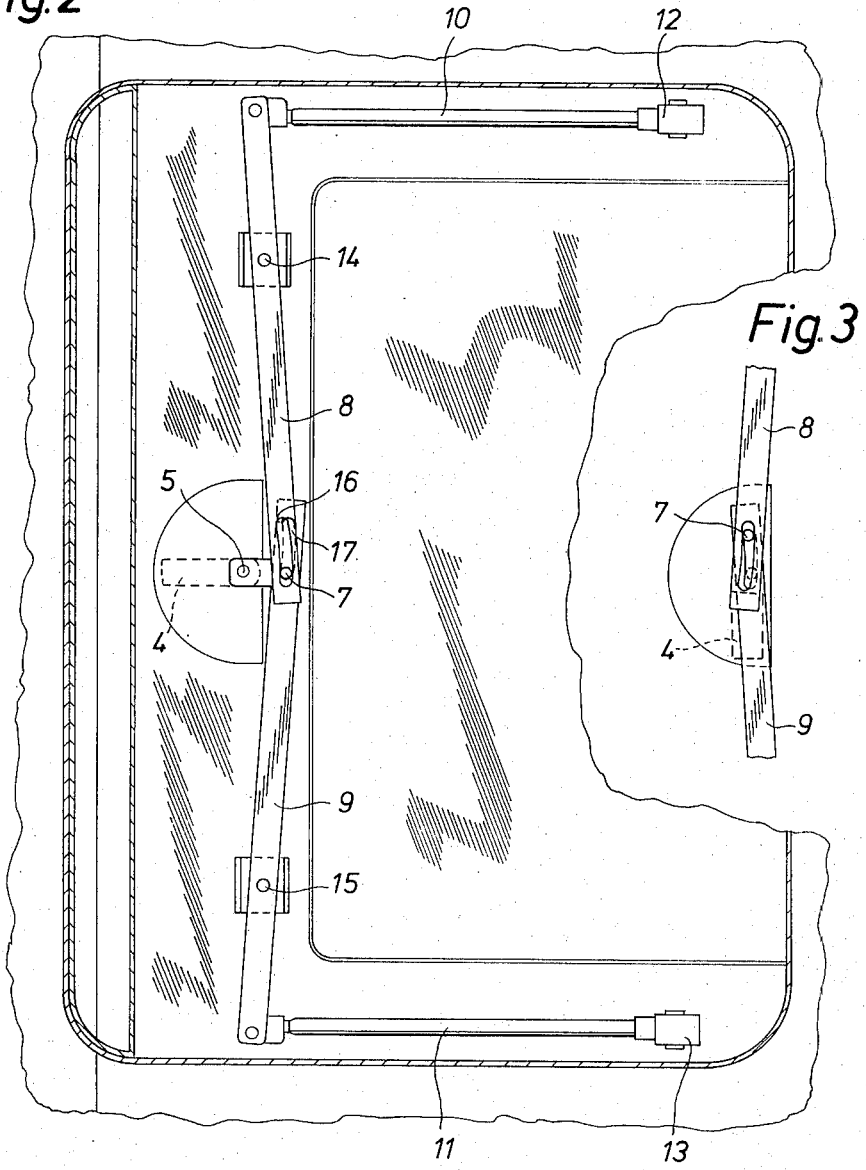

CLAMPING LINKAGE FOR AUTOMOBILE SLIDING ROOFS

BACKGROUND OF THE INVENTION

1. Field of the Invention

The present invention relates to clamping devices for rigid automobile sliding roofs, and in particular to clamping linkages for such devices which include a longitudinally movable clamping rod on each side of the sliding roof which, through its longitudinal motion, operates the clamping mechanisms.

2. Description of the Prior Art

Clamping devices using a clamping linkage for their actuation are known in the prior art. However, the operation of these prior art linkages from a common operating lever previously necessitated an additional complex mechanism which had to be maintained under constant spring preload.

SUMMARY OF THE INVENTION

It is a primary objective of the present invention to overcome the aforementioned shortcomings by suggesting a simpler actuating mechanism for the clamping device. An additional objective of the present invention is to reduce the required operating motion of the central actuating lever.

The invention proposes to attain the above objectives by suggesting a clamping linkage which includes two rocking levers connected to the two longitudinal brake rods of the clamping device, the rocking levers overlapping one another in the mid-portion of the sliding roof, the overlapping portions of the rocking levers including each a longitudinal slot which is engaged by an actuating pin of a hand-operated central actuating handle whose movement releases and sets the clamping device.

In a preferred embodiment of the invention the hand-operated actuating handle is pivotable around a pivot point between a central longitudinal position in which the clamping device is set, and a lateral or transverse position in which the clamping device is released. The necessary motion of the actuating handle is thus reduced to approximately 90°. The preferred embodiment thus also provides a self-locking feature, whereby, in the set position of the clamping rods, any forces acting on these rods cannot, by themselves, operate the central handle to release the clamping mechanism.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows:

FIG. 1 shows in an elevational longitudinal cross section a stationary roof portion and the front portion of a rigid sliding roof with a clamping linkage embodying the invention;

FIG. 2 shows the invention in a horizontal cross section taken along line II—II of FIG. 1, the clamping device and clamping linkage being shown in the set position; and FIG. 3 shows the clamping linkage in the released position.

DESCRIPTION OF THE PREFERRED EMBODIMENT

In FIG. 1 is shown a rigid automobile sliding roof panel 1 which is movable longitudinally relative to the stationary roof portion 3 so that the roof can be opened by moving the sliding roof panel toward the rear and out of the roof opening 2.

As can be seen in FIG. 2, the sliding roof panel assembly includes on each side thereof longitudinally movable clamping rods 10 and 11 which are operable by means of a central actuating handle 4 which is pivotable around a pivot pin 5 and engages rocking levers 8 and 9 by means of an actuating pin 7, thereby shifting the clamping rods 10 and 11 between a forward position in which the clamping devices 12 and 13 are set, and a rear position in which these devices are released. This type of rigid sliding roof panel is normally so arranged that its rear portion has to be lowered before the sliding roof panel 1 can be moved rearward and under the stationary rear portion. For this purpose, the clamping devices 12 and 13 are normally arranged to operate both the lifting and lowering of the rear portion of the sliding roof as well as the longitudinal clamping of the latter in any desired position of opening displacement. Clamping devices of this kind are known and are not the subject of this invention.

The present invention particularly concerns itself with the actuation of the clamping rods 10 and 11 by means of a pair of simple rocking levers 8 and 9 which overlap one another in the mid-portion of the sliding roof, their pivot centers being located between the connecting points with the clamping rods and the overlapping portions.

Within their overlapping portions, rocking lever 8 includes a longitudinal slot 16 and rocking lever 9 includes a similar longitudinal slot 17. Both slots are engaged by the actuating pin 7 which is solidary with a short lever 6 extending from the pivot pin 5 of the central actuating handle 4. The rotation of handle 4 around the pivot pin 5 produces a similar opposite rotation of actuating pin 7, which, by engaging the slots 16 and 17 of the rocking levers 8 and 9 in a cam and cam follower made, moves the inner ends of these levers forward, thereby pushing the clamping rods 10 and 11 to the rear so as to release the clamping devices 12 and 13, respectively. A 90° rotation of handle 4 is sufficient to accomplish this purpose. During this release motion, the leverage arm between the pivot centers 14 and 15 and the actuating pin 7 decreases for rocking lever 8 and increases for rocking lever 9. However, this minor distortion with respect to the displacement obtained at the clamping rods 10 and 11 can easily be offset by correcting the alignment of the guide slots 16 and 17 relative to the pivot centers 14 and 15.

It is a particular advantage of the present invention that the linkage of the clamping device is self-locking in the clamped or set position as shown in FIG. 2, any forces exerted by the clamping rods 10 and 11 on the rocking levers 8 and 9 being directed to the pivot pin 5, so that the actuating handle 4 cannot be rotated into its release position by such forces. This represents an important safety feature against tampering with the sliding roof panel from the outside.

FIG. 3 shows the operating lever in its release position 4', the mid-portions of the rocking levers 8 and 9 having been moved forward through the displacement of the actuating pin to its position 7' in which it is closer to pivot point 14, but further away from pivot point 15. It should be understood, of course, that it is also possible to increase the overlapping portions of the rocking levers 8 and 9 and to extend the length of the slots 16 and 17 so that the operating handle 4 and the actuating pin 7 may be moved to either side of the center position to release the clamping devices.

It should also be understood that the foregoing disclosure describes only a preferred embodiment of the invention and that it is intended to cover all changes and modifications of this example of the invention which fall within the scope of the appended claims.

What is claimed is:

1. In a mechanism for the blocking and release of the longitudinal mobility of a rigid automobile sliding roof by means of oppositely arranged lateral clamping devices or the like, an actuating device comprising in combination:

two clamping rods extending near the longitudinal sides of the sliding roof, a first end of each rod being connected to one of said clamping devices, the clamping rods being movable longitudinally between a set position in which the mobility of the sliding roof is blocked and a released position in which the sliding roof is movable longitudinally between its open and closed positions;

two transversely extending rocking levers mounted in the sliding roof structure, the levers including: outer ends by which they are connected to the second ends of the clamping rods, inner end portions vertically overlapping one another in the midportion of the sliding roof, and a vertical-axis pivot between their outer and inner ends;

an operating handle positioned adjacent said overlapping inner end portions of the rocking levers, the handle being mounted on the sliding roof and rotatably connected thereto by a vertical-axis pivot; and actuating means defined by said overlapping inner end portions and by the operating handle for obtaining a fore and aft pivoting motion of the rocking levers from a rotary motion of the operating handle so as to set and release said clamping devices, said actuating means being of the cam and cam follower type.

2. A device as defined in claim 1, wherein
the rocking lever actuating means includes at least one horizontal slot defining a cam element and at least one vertical pin engaging the slot as a cam follower element, one of these elements being part of the operating handle, the other element being part of the rocking lever end portions.

3. A device as defined in claim 1, wherein:
the rocking lever end portions include each a slot defining a cam element, the two slots vertically overlapping one another over at least a portion of their length; and
the operating handle carries a vertical pin solidary therewith defining a cam follower element and engaging both of said vertically overlapping slots.

4. A device as defined in claim 3, wherein:
the rocking lever actuating means is self-locking in at least the position in which said clamping devices are set, thereby preventing a release motion of the actuating means under longitudinal forces acting on the clamping rods; said means being self-locking by virtue of said slots and said pin defining a dead center configuration in relation to the operating handle pivot in the set position of the actuating levers.

5. A device as defined in claim 4, wherein:
the pin and slot configuration of the operating handle and of the rocking levers, respectively, and the positions of the rocking lever pivots are so arranged that the operating lever undergoes a rotation of approximately 90°, when the clamping rods are moved from their set position to their released position.

6. A device as defined in claim 3, wherein:
the operating handle further includes a handle portion extending radially in one direction from its pivot and a lever portion extending radially in the opposite direction, said pin being a part of said lever portion.

* * * * *